United States Patent [19]

Reiter et al.

[11] Patent Number: 5,552,467
[45] Date of Patent: Sep. 3, 1996

[54] VEGETABLE OIL BASED THERMOSETTING LITHOGRAPHIC INK SYSTEM

[75] Inventors: Ralph H. Reiter, River Vale, N.J.; Narendra M. Patel, Mt. Pocono, Pa.

[73] Assignee: Sun Chemical Corporation, Fort Lee, N.J.

[21] Appl. No.: 398,729

[22] Filed: Mar. 6, 1995

[51] Int. Cl.$^6$ .............. C08L 23/00; C08K 5/04; C03C 17/00; C09D 11/06

[52] U.S. Cl. .......... 524/270; 524/394; 524/398; 524/399; 524/423; 523/160; 106/27 K; 106/20 R; 106/27 B; 106/30 R; 106/30 C; 430/949; 101/451; 101/452; 101/457

[58] Field of Search .............. 523/160; 524/270, 524/394, 398, 399, 423; 106/27 R, 20 R, 27 B, 30 R, 30 C; 430/949; 101/451, 452, 457

[56] References Cited

U.S. PATENT DOCUMENTS

| | | | |
|---|---|---|---|
| 4,253,397 | 3/1981 | Emmons et al. | 101/450.1 |
| 4,604,952 | 8/1986 | Daugherty | 101/451 |
| 5,308,390 | 5/1994 | Pennaz | 106/20 R |

*Primary Examiner*—Paul R. Michl
*Assistant Examiner*—LaVonda R. DeWitt
*Attorney, Agent, or Firm*—Jack Matalon

[57] ABSTRACT

Rapid thermosetting, low VOC web offset lithographic inks are prepared in the instant invention from solid resin, drying oil alkyds, bodied drying oil, vegetable oil, fatty acids, multifunctional unsaturated polyester, reducing agents and transition metal salts of organic acids. The aqueous lithographic fountain solution contains hydroperoxides or peroxides which promote free radical polymerization of the ink in contact therewith. The metal salts of organic acids function as crosslinking agents in combination with excess carboxylic acid functionality of the ink. Optionally, the reducing agent and the organic hydroperoxide or peroxide may be interchanged.

12 Claims, No Drawings

VEGETABLE OIL BASED THERMOSETTING LITHOGRAPHIC INK SYSTEM

FIELD OF THE INVENTION

This invention relates to novel, low volatile organic component (VOC) lithographic printing ink systems and methods for ink film production using the novel systems. The invention particularly relates to rapidly heat curable lithographic ink systems containing catalytic redox means and cross-linking agents for the combined initiation of free radical polymerization and crosslinking of vegetable oil based printing inks containing unsaturated polyester resin(s) having available carboxylic acid groups. The ink film produced by the invention is virtually 100% solids and tack-free.

BACKGROUND OF THE INVENTION

The volatile organic component (VOC) as a percentage of printing inks is rapidly becoming an important environmental issue. Formulations in many ink types have traditionally consisted of relatively high molecular weight polymers, a mixture of additives, pigment, and one or more volatile hydrocarbon solvents. These solvents may represent a potential worker exposure hazard and are also known to contribute to the tropospheric air pollution problem as well.

In order to overcome the problems associated with using solvents, both in the ink industry and other coatings industries, new technologically advanced products have arrived on the market. Present technology includes the use of water borne, high solids, and powder coating systems. High solids products are based on the solventless system in which polymerization occurs after application of the coating or ink are also available. These products usually employ relatively low molecular weight, highly functional resins in conjunction with a cross-linking agent and a "reactive diluent", if necessary, for viscosity reduction.

Lithographic printing is a process which utilizes a coated metal or polymeric plate containing a hydrophobic image area which accepts, i.e., it is wetted by, hydrophobic based ink and a non-image hydrophilic area which accepts water, i.e., the fountain solution. As practiced in the prior art, high speed web presses use inks that contain organic solvents to transport the ink. The drying of the printed ink film is achieved by solvent volatilization at a substrate temperature of about 150°–200° C. Consequently, the use of such inks in the prior art requires highly sophisticated emission control equipment in order to comply with clean air and occupational standards for exposure to organic solvents. Considering these environmental standards and the costs associated with complying with them under practical industrial conditions, artisans in the field of ink development have been vigorously engaged in the development of new inks that will more readily meet environmental standards but still provide the quality performance demanded for the final printed product.

It is an objective of the present invention to provide a solvent-free, high solids, low VOC printing ink.

Another objective of the invention is to provide a solvent-free printing ink having a high level of flow properties, self structure capability and that is very fast drying.

Yet another objective of the invention is to provide the printing industry a solvent-free, fast drying, vegetable oil based "environmentally friendly" printing ink.

The foregoing objectives plus other features and advantages are achieved through the practice of the discoveries of the instant invention as described hereinafter.

SUMMARY OF THE INVENTION

Heat-set, low VOC web offset lithographic inks are prepared in the instant invention from solid resin, drying oil alkyds, bodied drying oil, vegetable oil, fatty acids, multifunctional unsaturated polyester, reducing agents and transition metal salts of organic acids. The lithographic fountain solution contains water soluble or emulsifiable hydroperoxides which promotes free radical polymerization of the ink system when placed in contact with the ink formulation of the invention.

The invention provides a solvent-free lithographic printing ink that dries rapidly under the influence of heat. The invention is based on redox initiation systems composed of initiators such as free radical forming organic hydroperoxide and peroxide dissolved in a fountain solution and reducing agents such as ferrous compounds in the printing ink. Optionally, the hydroperoxide may be contained in the ink and the reducing agent contained in the fountain solution. The printing ink also contains organometallic compounds, i.e., zirconium carboxylates that function as crosslinking agents. Upon application of heat during heat set drying, thermal curing takes place via free radical crosslinking between unsaturated materials and crosslinking reaction through interaction between carboxy groups contained in the printing vehicles and organic acid salts where the organic acid has an acid functionality of at least 2. Zirconium compounds of organic acids are preferred.

More particularly, the invention is a vegetable oil-based, heat curable lithographic printing ink system comprising a first part comprising a liquid lithographic printing ink containing pigment, a vegetable oil based rosin ester, unsaturated polyester resin(s) having free carboxylic acid groups, a reducing agent and a cross-linking agent comprising an organometallic salt; and a second part comprising an aqueous fountain solution containing an organic hydroperoxide or peroxide. The reducing agent may be contained in the fountain solution while said organic hydroperoxide or peroxide is contained in said ink.

In a preferred embodiment, the aqueous fountain solution contains between 1–5 weight percent of organic hydroperoxides or peroxides as an oxidizing agent. The liquid lithographic printing ink contains between 1–10 weight percent of a reducing agent, 1–5 weight percent of a cross-linking agent comprising an organometallic salt, 5–60 weight percent of vegetable oil based rosin ester, 5–30 weight percent pigment and 5–20 weight percent unsaturated polyester resin(s) having free carboxylic acid groups.

DETAILED DESCRIPTION OF THE INVENTION

The present invention employs a two part thermosetting ink system for curing or drying vegetable oil based lithographic printing ink on non-metallic plate or film. The first part contains pigment, vegetable oil based rosin ester gel, one or more reducing agents, a polyester formed by esterification of an aliphatic polyol and $C_{12}$ to $C_{20}$ unsaturated fatty acid, an aromatic polyester modified with trimellitic anhydride to produce a resin containing free carboxylic acid groups, and organometallic salts having a functionality of at least 1. Preferably, zirconium compounds are included as the organometallic salt which are capable of forming strong crosslinking bonds with the free carboxylic acid groups of the foregoing resins.

The second part consists of an aqueous lithographic fountain solution containing free radical forming and water miscible hydroperoxides, peroxides, or both.

The present invention is derived from the discovery that when the novel lithographic ink system described above as parts 1 and 2 is substituted for a conventional ink system as used in lithographic printing plate preparation, i.e., ink and fountain solution, the free radical initiating catalysts contained in the aqueous fountain solution and normally used to treat the hydrophilic part of the lithographic plate migrates into or is absorbed in the liquid ink deposited on the oleophilic image part of the plate when these two components inevitably come into contact during dampening in the plate making process. When the catalyst in the fountain solution is absorbed into the liquid ink on the imaging surface, a composition is thereby formed that lends itself to redox initiated, free radical polymerization and crosslinking of olefinic unsaturation in the ink vehicle upon heating. Further, it has been discovered, the presence of excess carboxylic acid functionality in the liquid ink and organometallic salts produces additional crosslink formation when the system is subjected to heat or thermosetting treatment.

The phenomenon of catalyst migration from fountain solution into ink vehicle, it has been discovered, is not restricted to the migration of organic hydroperoxide or peroxide migration from fountain solution into the ink vehicle. For example, the reducing agent contained in first part, the ink vehicle, as taught above may optionally be contained in the second part, the fountain solution, while the organic hydroperoxide or peroxide is added to the ink vehicle formulation. The process of the invention proceeds as well in either configuration.

Ferrous compounds are preferred in the invention as reducing agents to form free radicals by redox reaction with hydroperoxide during drying process. Particularly preferred ferrous compounds are ferrous ammonium sulfate, ferrous sulfate, ferrous lactate, ferrous naphthenate and ferrous oxalate. However, other lower valence state salts can be used as reducing agents.

Free radical forming oxidizing agents useful in the compositions of the invention include cumene hydroperoxide, benzoyl peroxide and tertiary butyl hydroperoxide.

Printing ink compositions based on the vehicles and additives of the invention may employ a wide variety of pigments. Examples of suitable pigments are: phthalo cyanine blue, benzidine yellow, litho rubine red, and carbon black.

The ink system of the invention can be dried or cured at temperatures between 100° C. and 180° C., preferably between 150°–180°C.

While not intending to be constrained by theoretical consideration, it is believed that the process of the invention involves the following curing mechanisms when the treated printed plate is dried between 150°–180° C.:

Oxidation-reduction reaction between hydroperoxide and ferrous compounds produces the free radicals which propagate the polymerization or drying of vegetable oils producing crosslinks with multi function unsaturation present in the ink system;

zirconium compounds react strongly with carboxylic acid groups, forming covalent bonds while hydrogen bonds are formed with hydroxy groups which, in combination, further enhances the drying of the novel printing ink of the invention.

Since no volatile reaction by-products are produced by the process of the invention, the product of the invention is essentially 100% non-volatile. The novel printing ink is stable for long periods since there are no driers and/or free radical forming hydroperoxides or peroxides present in the ink system when the ink system is formulated to include reducing agents. The use of zirconium compounds as crosslinking agents, ferrous compound as reducing agent and hydroperoxide and peroxide in the fountain solution, significantly lowers the drying time of the printed ink without disturbing the stability of the ink system.

The present invention is hereafter further described with reference to particular examples thereof. It will be appreciated that these examples are presented for illustrative purpose and should not be constructed as a limitation on the scope of the invention as herein described.

In the following Examples all four colors, including cyan blue, magenta red, yellow and black printing inks were trialed on a 2/color 25" G.P.I. Miehle Press at 6,000 sheets/1 hour, impression. A Westvaco sterling litho gloss paper was used as a printing substrate. All four colors were printed at standard web offset printing optical density ranging from 1.01 to 1.75. After printing, these sheets were tested for drying on a sinvatrol drying tester with a belt speed of 40 ft./min. at 150° to 180° C. temperature. A total of 1000 sheets were printed for each color.

The two part printing ink system of the invention depicted in the following examples consists of printing ink compositions using ferrous compound as reducing agent in the first part. The second part consists of a concentrate Roso KSP #500 M-3 fountain solution diluted with tap water according to the manufacturer's instructions. To the diluted fountain solution water miscible tertiary butyl hydroperoxide-70 was added as free radical forming to provide a 5% solution of oxidizing solution.

A high solid, low VOC soya oil based heatset printing ink having the following composition was prepared. The first three examples illustrate the application of ferrous compound as reducing agent in the fountain solution and free radical forming oxidizing agent in the ink formulation. All inks were prepared by first preparing a concentrated base material, consisting pigment, varnish and reactive diluent. This base was then used to prepare the final ink formulation. The ink formulas are described in the following by parts and percentage by weight. In Example 1, the soya oil based rosin ester was obtained from Lawter International, Inc. as Ultrex 100.

EXAMPLE 1

| Ink Formulation | Parts |
| --- | --- |
| 1. Soya oil based rosin ester | 56.00 |
| 2. Phthalo blue pigment | 15.00 |
| 3. Conjugated linoleic acid | 9.00 |
| 4. Unsaturated cycloaliphatic oligomer (Astrocure - 78) | 10.00 |
| 5. Polyethylene wax | 5.00 |
| 6. t-butyl hydroperoxide | 5.00 |
|  | 100.00 |

Prior to the printing process 5% ferrous sulfate was added to diluted Roso KSP #500 M-3 fountain solution. When the printing process takes place, the ink comes in contact with ferrous sulfate via fountain solution. An oxidation—reduction reaction between t-butyl hydroperoxide of the ink and ferrous sulfate of the fountain solution forms the free radicals which propagate the crosslinking reaction between the unsaturated materials of the ink. As a result the ink is dry to the touch at 150° to 180° C. within 1 second.

EXAMPLE 2

Example 1 was repeated by substituting tertiary butyl hydroperoxide with cumene hydroperoxide. The resultant ink, in the presence of ferrous sulfate in the fountain solution, is dry to the touch at 150°–180° C. temperature within 1 second.

EXAMPLE 3

Example 2 was repeated without using ferrous sulfate reducing agent in the fountain solution. The resultant ink does not dry to the touch at 150° C. within 1 second. The results indicted that a reducing agent, for example ferrous sulfate, is required to form free radicals by redox reaction which helps to dry the ink by free radical crosslinking reaction at a lower temperature of 150° C.

EXAMPLE 4

Examples 4 to 8 illustrate the application of ferrous compound as a reducing agent in the ink formulation and oxidizing agent, for example t-butyl hydroperoxide-70 in the fountain solution. It also describes the second drying mechanism by crosslinking carboxy groups containing polyester and zirconium compounds to obtain through dry to the print at higher optical density between 1.60 to 1.90. Following is the ink formulation:

| Ink Formulation | Parts |
|---|---|
| 1. Soya oil based rosin ester | 43.52 |
| 2. Phthalo blue pigment | 14.25 |
| 3. Linseed oil based polyester | 4.75 |
| 4. Carboxy group containing polyester | 14.25 |
| 5. Conjugated Linoleic acid | 9.95 |
| 6. Ferrous Naphthenate | 5.70 |
| 7. Zirconium Propionate | 1.88 |
| 8. Polyethylene/PTFE wax | 4.75 |
| 9. Zinc Neodeconate | 0.95 |
| | 100.00 |

Fountain solution: Roso KSP #M-3+5% t-butyl hydroperoxide-70. The ink, when printed on a 38 inch Miehle sheetfed press, showed no signs of offset and dried to the touch within 1 second at 150°–180° C.

Example 5

This heatset ink was prepared by substituting ferrous naphthenate with cerium octoate. The material oxidizes the hydroperoxide to form free radicals, which crosslink the unsaturation material of the ink during the ink drying process. The following is the ink formulation:

| Ink Formulation | Parts |
|---|---|
| 1. Soya oil based rosin ester | 44.90 |
| 2. Phthalo blue pigment | 19.25 |
| 3. Carboxy group containing polyester | 2.55 |
| 4. Conjugated linoleic acid | 6.40 |
| 5. Linseed oil based polyester | 6.40 |

-continued

| Ink Formulation | Parts |
|---|---|
| 6. Cerium Octoate | 8.98 |
| 7. Polyethylene/P-T-F-E Wax | 8.97 |
| 8. Zirconium Propionate | 2.55 |
| | 100.00 |

EXAMPLE 6

High solid, low VOC, magenta red heatset ink was prepared by utilizing the following formulation:

| Ink Formulation | Parts |
|---|---|
| 1. Soya oil based rosin ester | 44.90 |
| 2. Litho rubine red pigment | 19.65 |
| 3. Linseed oil based polyester | 6.50 |
| 4. Conjugated linoleic acid | 7.55 |
| 5. Carboxy group containing polyester | 5.70 |
| 6. Polyethylene/P-T-F-E wax | 6.85 |
| 7. Zirconium Propionate | 3.15 |
| 8. Ferrous Naphthenate | 5.70 |
| | 100.00 |

The resultant ink was dry to the touch at 150° C. within 1 second.

EXAMPLE 7

Transparent yellow heatset ink was prepared by the following formulation:

| Ink Formulation | Parts |
|---|---|
| 1. Soya oil based rosin ester | 41.70 |
| 2. Transparent yellow pigment | 10.65 |
| 3. Linseed oil based polyester | 3.55 |
| 4. T.M.A. modified benzoate ester | 14.90 |
| 5. Conjugated linoleic acid | 18.05 |
| 6. Ferrous Naphthenate | 4.65 |
| 7. Polyethylene/P-T-F-E wax | 3.70 |
| 8. Zirconium Propionate | 2.80 |
| | 100.00 |

The resultant ink of Example 7 dried at 150° C. within 1 second.

EXAMPLE 8

High solids black heatset ink was prepared as follows:

| Ink Formulation | Parts |
|---|---|
| 1. Soya oil based rosin ester | 32.85 |
| 2. Carbon black pigment | 11.45 |
| 3. Linseed oil based alkyd resin | 3.80 |
| 4. Conjugated linoleic acid and T-M-A modified benzoate ester | 20.00 |
| 5. Conjugated linoleic acid | 13.90 |
| 6. Ferrous Naphthenate | 5.00 |
| 7. Polyethylene/P-T-F-E wax | 4.00 |
| 8. Zirconium Propionate | 3.00 |
| | 100.00 |

The resultant inks of Examples 4 to 8 were dried by the dual mechanism: (1) free radical cross-linking reaction between unsaturated materials of the ink and (2) crosslinking reaction through interaction between carboxyl groups of the printing ink vehicle and zirconium compounds. The final print showed no signs of offset and dried to the touch at 150° C. within 1 second.

What is claimed is:

1. A vegetable oil-based, heat curable lithographic printing ink system comprising:

a first part comprising a liquid lithographic printing ink containing pigment, a rosin ester containing vegetable oil, unsaturated polyester resin(s) having free carboxylic acid groups, a reducing agent comprising a lower valence state salt and a cross-linking agent comprising an organometallic salt selected from the group consisting of carboxylic acid salts of Groups IIA–VIIIA metals of the Periodic Table of the Elements plus copper, zinc, aluminum, tin and lead; and a second part comprising an aqueous fountain solution containing an organic hydroperoxide or peroxide.

2. The system of claim 1 wherein said reducing agent is contained in said fountain solution while said organic hydroperoxide or peroxide is contained in said ink.

3. The system of claim 1 wherein said rosin ester containing vegetable oil comprises rosin ester containing soya oil.

4. The system of claim 1 wherein said polyester comprises the polymeric residue of an aliphatic alcohol, $C_{12}$–$C_{20}$ unsaturated fatty acid and aromatic carboxylic acid(s) including at least one aromatic carboxylic acid having a functionality greater than 2.

5. The system of claim 4 wherein said unsaturated fatty acid comprises linoleic acid and said carboxylic acid(s) comprise a mixture of benzoic acid and trimellitic anhydride.

6. The system of claim 1 wherein said cross-linking agent comprises zirconium propionate.

7. The system of claim 1 wherein said hydroperoxide or peroxide is selected from the group consisting of cumene hydroperoxide, benzoyl peroxide and tertiary butyl hydroperoxide.

8. The system of claim 1 wherein said reducing agent is selected from the group consisting of ferrous ammonium sulfate, ferrous sulfate, ferrous lactate, ferrous oxalate and ferrous naphthenate.

9. An organic solvent free, heat curable lithographic printing ink system comprising:

an aqueous fountain solution containing between 1–10 weight percent of a reducing agent selected from the group consisting of ferrous ammonium sulfate, ferrous sulfate, ferrous lactate, ferrous oxalate and ferrous naphthenate; and liquid lithographic printing ink containing 1–5 weight percent of a cross-linking agent comprising an organometallic salt, 1–5 weight percent of organic hydroperoxide or peroxide selected from the group consisting of cumene hydroperoxide, benzoyl peroxide and tertiary butyl hydroperoxide, 5–60 weight percent of rosin ester containing vegetable oil, 5–30 weight percent pigment and 5–20 weight percent unsaturated polyester resin(s) having free carboxylic acid groups.

10. The system of claim 9 wherein said reducing agent is contained in said liquid lithographic printing ink while said organic hydroperoxide or peroxide is contained in said fountain solution.

11. A vegetable oil-based, heat curable lithographic printing ink system comprising a first part comprising a liquid lithographic printing ink containing:

a. pigment, b. a rosin ester containing vegetable oil, c. unsaturated polyester resin(s) having free carboxylic acid groups wherein said polyester comprises the polymeric residue of an aliphatic alcohol, $C_{12}$–$C_{20}$ unsaturated fatty acid and aromatic carboxylic acid(s) including at least one aromatic carboxylic acid having a functionality greater than 2 wherein said unsaturated fatty acid comprises linoleic acid and said carboxylic acid(s) comprise a mixture of benzoic acid and trimellitic anhydride, d. a reducing agent selected from the group consisting of ferrous ammonium sulfate, ferrous sulfate, ferrous lactate, ferrous oxalate and ferrous naphthenate, e. and a cross-linking agent comprising an organometallic salt; and a second part comprising an aqueous fountain solution containing an organic hydroperoxide or peroxide.

12. A vegetable oil-based, heat curable lithographic printing ink system comprising:

a first part comprising a liquid lithographic printing ink containing pigment, a rosin ester containing vegetable oil, unsaturated polyester resin(s) having free carboxylic acid groups, a reducing agent selected from the group consisting of ferrous ammonium sulfate, ferrous sulfate, ferrous lactate, ferrous oxalate and ferrous naphthenate and a cross-linking agent comprising zirconium propionate; and a second part comprising an aqueous fountain solution containing an organic hydroperoxide or peroxide.

* * * * *